United States Patent [19]

Brunet et al.

[11] 4,168,193

[45] Sep. 18, 1979

[54] METHOD OF MANUFACTURING RUBBER ARTICLES AND MEANS FOR CARRYING OUT SAID METHOD

[75] Inventors: Jean-Pierre Brunet; Jean Carpentier; Gilbert Fuss, all of Pas-de-Calais, France

[73] Assignee: The Firestone Tire & Rubber Company, Akron, Ohio

[21] Appl. No.: 898,732

[22] Filed: May 11, 1978

Related U.S. Application Data

[63] Continuation-in-part of Ser. No. 808,854, Jun. 22, 1977, abandoned.

[30] Foreign Application Priority Data

Jun. 23, 1976 [FR] France ............................ 76 19096

[51] Int. Cl.² .................... B29H 3/08; B29H 17/12
[52] U.S. Cl. ........................ 156/131; 152/357 A; 152/362 R; 264/259; 264/271; 264/277
[58] Field of Search ............... 156/123 R, 131, 136, 156/398, 422, 460, 125, 128; 152/357 A, 362; 264/34, 35, 240, 241, 259, 271, 277, 315, 326

[56] References Cited

U.S. PATENT DOCUMENTS

| 948,064 | 2/1910 | Seiberling et al. | 156/131 |
| 1,426,672 | 8/1922 | Radford | 156/129 |
| 2,497,226 | 2/1950 | McNeill | 156/125 |
| 3,381,736 | 5/1968 | Ford et al. | 152/362 R |
| 3,472,715 | 10/1969 | Weinbrenner et al. | 156/125 |
| 3,787,263 | 1/1974 | Yonekawa et al. | 156/136 |
| 3,837,986 | 9/1974 | Gorter et al. | 152/357 A |
| 3,895,986 | 7/1975 | Komatsu | 156/136 |

Primary Examiner—John E. Kittle

[57] ABSTRACT

The method used in whole or in part, accelerated but unvulcanized rubber. Forming is done by injection, preserving the properties of plasticity and adhesive power of the rubber, after unmolding and before any vulcanization. The blanks and intermediate products thus fabricated are capable of being integrated, by subsequent successive operations of any type, into more complex assemblies. This method is especially useful in the manufacture of an assembly of a tire bead and an unvulcanized rubber filler strip wherein the filler strip is injected onto the bead to form the assembly.

2 Claims, 3 Drawing Figures

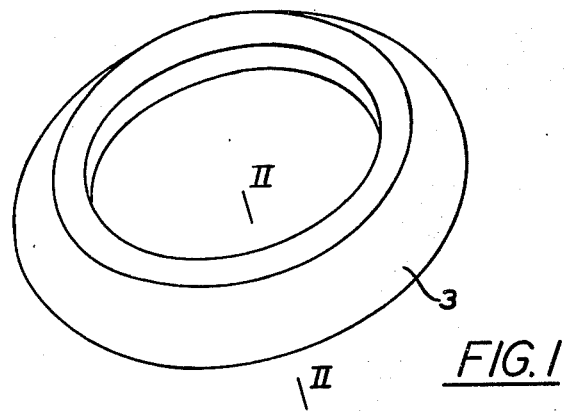
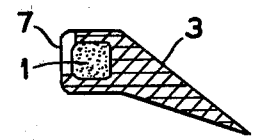
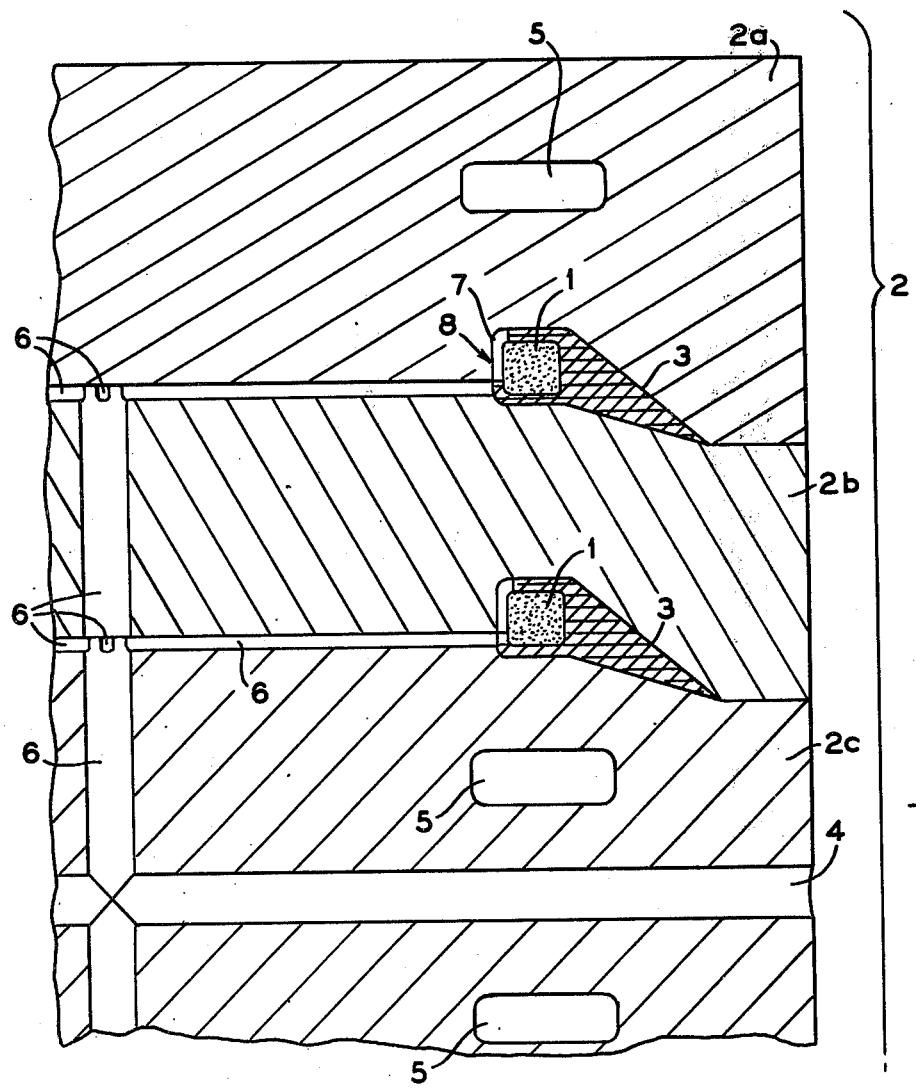

4,168,193

METHOD OF MANUFACTURING RUBBER ARTICLES AND MEANS FOR CARRYING OUT SAID METHOD

REFERENCE TO FIRST APPLICATION AND PRIORITY

This application is a continuation-in-part of application Ser. No. 808,854, filed June 22, 1977 now abandoned, and claims priority from French Application Ser. No. 76 19.096, filed June 23, 1976.

BACKGROUND OF THE INVENTION

1. Field of the Invention

The present invention relates to a method of manufacturing articles based on rubber and is applicable generally to rubber fabrication industries.

2. Description of the Prior Art

Industrial products exist which are entirely or partially based on rubber whose composition, structure and geometric shape are relatively complex.

Their manufacture assumes the use of materials which are different both in their nature and their composition. It is necessary, mostly, to form a blank from intermediate elements, to produce a well-defined final structure. This is followed lastly, by the final molding operation which simultaneously realizes two objectives, on the one hand, the almost final dimensional shaping of the product and, on the other hand, the vulcanization of the rubber mixes.

The forming of the blank assumes very considerable labor and fabricating means. The molding operation constitutes practically the last step in the manufacture.

The formation of the blank is an operation of assembling intermediate products of which the layout, carried out according to a given procedure, leads to the establishment of the final structure. It is important, at this stage of manufacture, to have intermediate products possessing good adhesion, that is to say the ability of each element to adhere or to stick to the structure in the course of fabrication without resorting to glueing agents. it is also important to have sufficient plasticity to insure ease of shaping by the action of stresses.

It must be noted that the plasticity of the elements is, to a very great extent, one of the most difficult problems to master in the production of intermediate products having dimensional characteristics which are both very accurate and very faithfully reproduced.

In the course of the molding operation, the vulcanization of the rubber mixes is carried out under the simultaneous action of time, temperature and pressure. This irreversible transformation modifies the physical and chemical properties of the initial mixes by conferring elasticity on them and causing the properties of adhesion and plasticity to practically disappear.

The molding operation always associates a dimensional shaping and a vulcanization, even partial, and hence a heat stabilizing of the product.

There are known to exist injection molding units for the fabrication of simple parts, in the sense that they use only a single rubber mix, but can be complex in their shape. The mix is introduced directly into the closed mold, through an injection nozzle, after plasticizing of the rubber mix. The advantage is the reduction in the time of vulcanization of the part since the injection temperature of the rubber is very close to its vulcanizing temperature.

Lastly, the adhesive power and plasticity of accelerated but unvulcanized rubbers and their capacity to preserve these properties as long as no vulcanization has taken place, are known.

GENERAL DESCRIPTION OF THE INVENTION

It is an object of the invention to provide a manufacturing method for blanks and intermediate products based on rubber, which method is characterized in that it has recourse to:

on the one hand, wholly or in part, accelerated but unvulcanized rubber compound;

and on the other hand, forming by injection, preserving the properties of plasticity and adhesive powers of the rubber after unmolding and before any vulcanization, the blanks and intermediate products thus fabricated being capable of being integrated by successive subsequent operations of any type, into more complex assemblies.

Exemplary of this invention is the formation of an assembly of a rubber bead filler strip and annular bead core. The rubber compound utilized in the invention is of a standard type used for bead fillers in tires. It comprises a rubber, reinforcing filler, softeners, antioxidants, vulcanization accelerators, and vulcanizing agents. The rubbers utilized may be natural rubber, synthetic rubbers of the butadiene type (either homopolymers of butadiene or copolymers with styrene), or a combination of these rubbers.

The annular bead core may be any of the known materials, strands of wire, fiberglass or other inextensible materials. Usually several wire strands are used.

The method according to the invention comprises the following:

1. The accelerated, unvulcanized rubber compound as described above is plasticized at a first temperature. This temperature must be high enough to make the rubber compound plastic enough for the injection molding process yet cannot be too high to cause premature, partial vulcanization of the rubber compound. A temperature of between 180° and 250° has been found to be acceptable.

2. In the embodiment of this invention wherein a bead filler-bead core assembly is made, an annular bead core is placed in the mold prior to the injection of the plasticized rubber compound.

3. The plasticized rubber compound is injected into a closed mold under high pressure at a specific temperature. Again, this temperature must be sufficiently high to maintain the rubber compound at a plastic, flowable state yet must not be too high to cause partial, premature vulcanization. Temperatures in the range of 175°–225° F. have been found acceptable. The pressure under which the rubber compound is injected into the mold is in the range of 12,000 to 20,000 psi.

4. The surfaces of the closed mold are maintained at a temperature to avoid premature vulcanization of the compound. The surface of the mold must be maintained at a temperature of 75°–100° F. This is accomplished by cooling the molds with cooling water by standard techniques. This low temperature avoids premature vulcanization of the injected rubber compound at the mold surfaces and throughout the compound thereby preserving the previously described properties of the rubber compound and facilitating easy unmolding.

5. The assembly is easily unmolded. It is assembled into a tire by standard means.

6. The assembled, uncured tire is then vulcanized by standard means.

It is possible to produce in a single operation of the injection type an assembly of a bead filler and a bead core which is later used in the manufacture of a tire. Tire manufacturing methods previously necessitated use of several techniques leading to the fabrication of one or more parts in order to apply the bead filler and bead core during the assembly of a tire on the building drum. These techniques have the intermediate drawbacks of storage, identification and preparation of the individual parts.

The dimensional qualities of the intermediate products are improved, the molding operation being more accurate.

Due to the fact of the pressure utilized, any possibility of including air is eliminated.

The droppings and rejects can be recycled, which is not the case with vulcanized elements.

The level of productivity is high.

Other characteristics and advantages of the present invention will emerge from the description which follows with reference to the accompanying drawing relating to the manufacture of pneumatic tires, without this however constituting a limitation on the scope of the invention.

BRIEF DESCRIPTION OF THE DRAWINGS

In the drawings:

FIG. 1 shows in perspective the assembly of components necessary for the production of the intermediate product;

FIG. 2 is a sectional view along the line II—II of FIG. 1; and

FIG. 3 shows a type of mold with a centering device for the core and a regulating device.

DESCRIPTION OF A PREFERRED EMBODIMENT

The method consists of firstly plasticizing by any suitable means an accelerated unvulcanized rubber compound, and injecting this rubber compound at a certain temperature into a closed mold regulated in temperature. This particular temperature regulation is utilized for the purpose of avoiding vulcanization of the rubber compound, even at the surface, in order to preserve in it the previously described properties and also to permit easy and rapid unmolding, without the intervention of specific unmolding compounds which could alter the properties of adhesion of the rubber compound in the subsequent use of the intermediate product. Moreover, the physical properties of the compound develop in such a way that the distortion (especially shrinkage) of the part is minimal in the course of the unmolding operation.

The case of a pneumatic tire may be taken as an example. Its fabrication calls upon rubber mixes with well-defined physical and chemical properties, on cables of natural or synthetic style fibers, on steel wires, etc.

Recourse is had to extrusion to produce sectional elements in the manufacture of a tire and to calandering for the preparation of rubber compounds in sheets to coat textile or metal cords in layers. Subsequent operations of cutting, preparation and conditioning result in the fabrication of elements taking part in the composition of the unvulcanized tire.

In standard tire manufacture the "intermediate" product or "assembly" of the bead core or bundle, the covering of the bead core and the bead filler strip are united in a final stage, after a preparatory operation. In this invention the bead core and the bead filler strip are united prior to assembly into the final product into a pre-assembly of one piece. This means that the piece is built into the tire for this operation, instead of the two pieces previously used.

Referring to this method as shown by the drawings, the bead core 1 is introduced into the cold-forming mold 2 and the filler rubber compound 3 is injected at very high pressure through a nozzle 4 after it has been warmed up by mixing (plasticized) to the proper temperature. The mold shown in FIG. 3 is a multiple mold and hence composed of several complementary blocks or units (2a, 2b, 2c, etc.). Certain of these units are traversed by a circulation of fluid through passages 5 forming part of a temperature regulating device avoiding any vulcanization. In common practice cold water is circulated to maintain the proper temperature in the mold.

The units define between them a system of branches 6 for the distribution of the filler rubber compound, connected to the injection nozzle 4.

The metallic bead core 1 is held in its place in the mold space formed between two blocks, by a centering or holding device constituted by a ring 7 to which it is fastened. The ring is itself ensleeved on an annular wall 8 formed in one of the two blocks. On unmolding, the ring 7 forms an integral part of the intermediate product, (FIG. 2).

Generally, the invention enables, by means of an injection unit, the cold-forming of parts of accelerated but unvulcanized rubber compound, even superficially, including only a single rubber compound or including several types of rubber compounds.

Specifically, the method of this invention has been formed in the manufacture of the bead core - bead filler strip assembly wherein the bead core, 1, was placed in the mold. The rubber compound was specially designed to be the bead filler strip and comprised natural rubber, reinforcing carbon black, softeners, vulcanization accelerator and vulcanizing agents. This compound was plasticized to a temperature of between 180° and 250° F., preferably between 200° and 225° F. For the purpose of defining this invention, this temperature will be called the "first temperature". This first temperature represents a temperature which is sufficiently high to make the rubber compound plastic and flowable yet not too high to cause premature vulcanization of the compound. This temperature is attained at nozzle 4 in the drawings.

The surface of the mold, 2, into which the rubber compound was injected to form the bead filler strip was maintained at a temperature 75°–100° F. This was accomplished by circulating cooling water through the passages, 5, shown in the FIG. 3. This temperature of the surface or skin of the mold enabled the manufacture of the assembly without any undesired, premature vulcanization of the rubber compound when the bead filler strip was being formed in the mold. It is necessary that this temperature is maintained at this low level to insure against this prevulcanization as heat is generated within the rubber compound during the injection process. For the purpose of defining this invention, this mold surface temperature will be referred to as the "second temperature".

The rubber compound was then injected into the mold under a pressure of 12,000 to 20,000 psi. The temperature of the rubber compound is the passages or branches, 6, was controlled to be within the range of 175°–225° F. This temperature was controlled for the reasons stated above for the first temperature. For the purpose of defining this invention, this temperature will be characterized as the "third temperature".

After the injection of the bead filler compound into the mold and the forming of the bead filler strip, 3, the mold was opened and the assembly of the wire bead bundle and the bead filler was removed. This assembly was then used in the building process for a standard pneumatic tire. In so doing, at least two steps in the building operation are eliminated; that is, separate steps of applying the bead filler strip as, with this invention, the bead filler strip was applied with the bead bundle. After the pneumatic tire was built into its uncured shape, the tire was vulcanized using standard methods. In the method of this invention it was necessary that the rubber compound that forms the bead filler strip is not vulcanized during any of the manufacturing operations until the final vulcanizing process for the entire tire.

The parts can include one or several supports of metal or material of other types.

The parts are if necessary assembled together due to the fact notably of their adhesive power and the group of parts thus assembled is vulcanized to obtain a predetermined final article.

It is to be well understood that the present invention has only been described and shown by way of preferential example and that equivalent modifications could be introduced into its constituent elements without however departing from the scope of said invention which is defined in the claims which follow.

We claim:

1. A method of manufacturing a pneumatic tire comprising the steps of placing an annular bead in a mold adapted to receive an accelerated, unvulcanized rubber compound by an injection system, said rubber compound comprising rubber polymers selected from a group consisting of natural and synthetic rubbers of the styrene-butadiene type, plasticizing said rubber compound at a first temperature sufficient to plasticize the rubber compound yet insufficient to cause premature, partial vulcanization of the compound, maintaining the surface of said mold at a second temperature to avoid vulcanization of said rubber compound, injecting said rubber compound at a third temperature under high pressure into said mold to form a bead filler piece contiguous with said annular bead, removing said annular bead and bead filler assembly from said mold while the rubber compound is still in an unvulcanized state, assembling said assembly into a tire by standard means and vulcanizing said tire by standard means.

2. The method of claim 1 wherein said first temperature is between 180° and 250° F., said second temperature is between 75° and 100° F., said third temperature is between 175° and 225° F., and said pressure is between 12,000 and 20,000 psi.

* * * * *